US007391537B2

(12) United States Patent
Eschbach et al.

(10) Patent No.: US 7,391,537 B2
(45) Date of Patent: Jun. 24, 2008

(54) USER INTERFACE FOR DIFFERENTIAL GLOSS IMAGES

(75) Inventors: Reiner Eschbach, Webster, NY (US); Shen-Ge Wang, Fairport, NY (US); William A. Fuss, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 644 days.

(21) Appl. No.: 10/952,413

(22) Filed: Sep. 28, 2004

(65) Prior Publication Data

US 2006/0127117 A1 Jun. 15, 2006

(51) Int. Cl.
*H04N 1/405* (2006.01)
*H04N 1/387* (2006.01)
*B41M 3/10* (2006.01)
*G06K 15/14* (2006.01)
*G06F 3/048* (2006.01)

(52) U.S. Cl. ............... 358/3.06; 358/3.2; 358/3.28; 358/1.18; 358/450; 358/452; 715/700

(58) Field of Classification Search ............ 358/1.9, 358/3.06, 3.13–3.2, 3.26–3.28, 533–536, 358/1.18, 450, 452–453, 537–538, 540, 300; 382/237, 270, 282, 284; 428/195.1; 399/341–342; 283/91, 93; 430/45.53
See application file for complete search history.

(56) References Cited

U.S. PATENT DOCUMENTS

| 3,317,317 A | | 5/1967 | Clark ...................... 96/1.4 |
| 3,784,289 A | * | 1/1974 | Wicker .................... 283/93 |
| 4,149,194 A | * | 4/1979 | Holladay ................ 358/3.16 |
| 4,210,346 A | | 7/1980 | Mowry, Jr. et al. ......... 283/93 |
| 4,310,180 A | | 1/1982 | Mowry, Jr. et al. ......... 283/93 |
| 5,087,507 A | | 2/1992 | Heinzer ................... 428/195 |
| 5,165,071 A | | 11/1992 | Moriya et al. |
| 5,234,783 A | * | 8/1993 | Ng ...................... 430/45.53 |
| 5,239,625 A | | 8/1993 | Bogart et al. |

(Continued)

FOREIGN PATENT DOCUMENTS

EP 0 478 012 A2 4/1992

(Continued)

OTHER PUBLICATIONS

Shen-ge Wang et al., U.S. Appl. No. 10/159,432, filed May 30, 2002, entitled "Application of Glossmarks for Graphics Enhancement".

(Continued)

*Primary Examiner*—Scott A Rogers
(74) *Attorney, Agent, or Firm*—Christopher D. Wait

(57) ABSTRACT

The present disclosure relates to providing a user interface for the effective generation of differential gloss images. The user is instructed to indicate the base primary image data, and the desired gloss image data. This data may be displayed for verification and position adjustment by superimposition of the gloss image data upon the base image data. In an alternative, the placement information may be inferred from the position of originals upon the scanner or copier platen and the result may or may not be displayed. By selectively applying halftones with different anisotropic structure orientation characteristics to the base primary image data as directed by the desired gloss image data, a differential gloss image file or hardcopy may be provided.

7 Claims, 5 Drawing Sheets

U.S. PATENT DOCUMENTS

| | | | |
|---|---|---|---|
| 5,487,567 A | 1/1996 | Volpe | 283/72 |
| 5,583,660 A | 12/1996 | Rylander | 358/3.17 |
| 5,678,133 A | 10/1997 | Siegel | 399/67 |
| 5,695,220 A | 12/1997 | Phillips | 283/91 |
| 5,710,636 A * | 1/1998 | Curry | 358/3.28 |
| 5,734,752 A | 3/1998 | Knox | 382/212 |
| 5,751,432 A * | 5/1998 | Gwaltney | 358/296 |
| 5,788,285 A | 8/1998 | Wicker | 283/93 |
| 5,853,197 A | 12/1998 | Mowry, Jr. et al. | 283/91 |
| 6,108,512 A | 8/2000 | Hanna | 399/366 |
| 6,222,637 B1 * | 4/2001 | Ito et al. | 358/1.18 |
| 6,606,168 B1 * | 8/2003 | Rylander | 358/3.09 |
| 6,714,320 B1 * | 3/2004 | Nakahara et al. | 358/3.13 |
| 6,763,121 B1 * | 7/2004 | Shaked et al. | 382/100 |
| 6,906,825 B1 * | 6/2005 | Nakahara et al. | 358/1.9 |
| 7,020,349 B2 * | 3/2006 | Brunk | 382/289 |
| 7,092,128 B2 * | 8/2006 | Wang et al. | 358/3.06 |
| 7,126,721 B2 * | 10/2006 | Wang et al. | 358/3.06 |
| 7,139,101 B2 * | 11/2006 | Loce et al. | 358/3.06 |
| 7,139,521 B2 * | 11/2006 | Ng et al. | 399/341 |
| 7,148,999 B2 * | 12/2006 | Xu et al. | 358/3.06 |
| 7,180,631 B2 * | 2/2007 | Ide et al. | 358/1.9 |
| 7,180,635 B2 * | 2/2007 | Wang et al. | 358/3.06 |
| 7,193,751 B2 * | 3/2007 | Wang et al. | 358/3.06 |
| 2003/0194148 A1 | 10/2003 | Haeberli | |
| 2005/0025333 A1 * | 2/2005 | Fujii et al. | 382/100 |
| 2005/0031160 A1 * | 2/2005 | Shaked et al. | 382/100 |
| 2005/0128523 A1 * | 6/2005 | Liu et al. | 358/3.06 |
| 2005/0128524 A1 * | 6/2005 | Liu et al. | 358/3.06 |
| 2005/0135851 A1 * | 6/2005 | Ng et al. | 399/341 |
| 2005/0286083 A1 * | 12/2005 | Wang et al. | 358/3.06 |
| 2006/0044617 A1 * | 3/2006 | Wang et al. | 358/3.06 |
| 2006/0072159 A1 * | 4/2006 | Eschbach et al. | 358/3.06 |
| 2007/0139714 A1 * | 6/2007 | McElvain | 358/3.06 |

FOREIGN PATENT DOCUMENTS

| | | |
|---|---|---|
| EP | 0 859 506 A1 | 8/1998 |
| EP | 1 367 810 A2 | 12/2003 |
| EP | 1370062 A1 * | 12/2003 |
| EP | 1 377 007 A2 | 1/2004 |
| EP | 1377007 A2 * | 1/2004 |
| EP | 1377028 A1 * | 1/2004 |
| EP | 1705529 A1 * | 9/2006 |
| EP | 1705531 A1 * | 9/2006 |
| GB | 2 217 258 A | 10/1989 |

OTHER PUBLICATIONS

Shen-ge Wang et al., U.S. Appl. No. 10/159,423, filed May 30, 2002, entitled "Halftone Image Gloss Control for Glossmarks".

Beilei Xu et al., U.S. Appl. No. 10/186,065, filed Jun. 27, 2002, entitled "Variable Glossmark".

Shen-ge Wang et al., U.S. Appl. No. 10/184,219, filed Jun. 27, 2002, entitled Protecting Printed Items Intended for Public Exchange with Glossmarks.

* cited by examiner

USER INTERFACE FOR DIFFERENTIAL GLOSS IMAGES

CROSS-REFERENCE TO RELATED APPLICATIONS

Cross reference is made to the following applications, the disclosures of each of which are incorporated by reference herein: Application Ser. No. 10/159,432 entitled "APPLICATION OF GLOSSMARKS FOR GRAPHICS ENHANCEMENT" to inventors Shen-ge Wang, Beilei Xu, and Chu-heng Liu; Application Ser. No. 10/159,423 entitled "HALFTONE IMAGE GLOSS CONTROL FOR GLOSSMARKS", to inventors Shen-ge Wang, Beilei Xu, and Chu-heng Liu; Application Ser. No. 10/186,065 "VARIABLE GLOSSMARK" to inventors Shen-ge Wang, Beilei Xu, and Chu-heng Liu; and Application Ser. No. 10/184,219 entitled "PROTECTING PRINTED ITEMS INTENDED FOR PUBLIC EXCHANGE WITH GLOSSMARKS" to inventors Shen-ge Wang, Beilei Xu, and Chu-heng Liu. The appropriate components and processes of the above co-pending applications may be selected for the invention of the present application in embodiments thereof.

BACKGROUND AND SUMMARY

The present invention in various embodiments relates generally the gloss inherent in the hardcopy of image data be it pictorial or text. This invention also relates to halftoned image data and the control of differential gloss when that halftone image data is printed into hardcopy. More particularly, this invention relates to a graphical user interface for enabling the creation of Glossmark™ image hardcopy differential gloss image prints.

It is desirable to have a way to protect against the copying of a document. Most desirably in a manner that part of the content can be readily observed by a human reader but not by a copier scanner. It is desirable that such a solution also have a minimum impact in its digital processing overhead requirements as well as minimizing any storage requirements. One approach is where an image is printed using clear toner or ink, creating a difference in reflected light and diffused light that can be discerned by a human reader by holding the paper at an angle, but can not be detected by a copier scanner which is restricted to reading at fixed angles to the page. Such an approach is a differential gloss image.

There has been a need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, there is illustrated, for example, a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a fixed angle. In this case, the diffused light is approximately equal for both toned and untoned surfaces, the scanner will detect no difference and the copier will not be able to copy the original.

Another approach taken to provide a document for which copy control is provided includes digital watermarking. As an example in U.S. Pat. No. 5,734,752 to Knox, there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

For each of the above patents and citations the disclosures therein are incorporated herein by reference in their entirety.

As disclosed in Application Ser. No. 10/159423 entitled "HALFTONE IMAGE GLOSS CONTROL FOR GLOSSMARKS", to inventors Shen-ge Wang, Beilei Xu, and Chu-heng Liu (cross referenced and incorporated above), there is provided an arrangement and methodology which will control gloss and allow manipulation for Glossmark differential gloss images without requiring special toners/inks or paper/substrates, nor require the superimposition of additional prints to allow viewing. However, to best allow Glossmark™ image technology to be proffered as a complete product offering, there needs to be a convenient method to enable relatively unskilled office workers and print shop operators to generate Glossmark™ images and prints in a straight-forward, on-the-fly, and uncomplicated manner. It would therefore be desirable to minimize the impact of such required additional electronic processing and human interaction with a software interface methodology for the manipulation of such inherent differential gloss images.

Image watermarks can be broadly classified as marks that modify the image data visibly, e.g.; by altering color or gray-level, or as marks that modify the image data invisibly, e.g.: by modifying high order bits not obviously visible. In the first scenario, the placement of the watermark is obvious an can easily be seen on the screen for verification. In the second case, the watermark is virtually invisible and spread around the entire image, making no user interface or visual verification necessary. Glossmark™ images modify the image data in a way that is not visible on any computer screen, be it CRT, LCD, etc. However, at the same time, the location of the Glossmark™ with respect to the base image is very important. Thus, there is a need to develop a user interface that allows interaction with the Glossmark™ by replacing the actual screen invisible Glossmark™ with a screen visible placeholder while simultaneously maintaining the integrity of the Glossmark™.

Disclosed in embodiments herein is a methodology for a differential gloss image user interface. The method provides instructing a user to indicate a base image and a desired gloss image. Then the user is instructed to indicate the relative position of the desired gloss image relative to the base image. A first halftone having a first anisotropic structure orientation and a second halftone having a second anisotropic structure orientation different from that of the first halftone are provided. The base image is halftoned with the provided first and second halftones by toggling between them as directed by the desired gloss image.

Further disclosed in embodiments herein is a methodology for a differential gloss image graphical user interface comprising instructing a user to indicate a base image and a desired gloss image. The indicated desired gloss image is flattened into a binary file and the resolution is adjusted to correspond to the Glossmark™ screen setup and base image screen resolution if needed. This is followed by displaying the indicated desired gloss image as a placeholder superimposed upon the indicated base image and instructing the user to indicate the relative position of the desired gloss image relative to the base image. A first halftone having a first anisotropic structure orientation and a second halftone having a second anisotropic structure orientation different from that of the first halftone are provided. These are used in halftoning the base image by toggling between the provided first halftone and the provided second halftone as directed by the desired gloss image.

Further disclosed in embodiments herein is a methodology for a differential gloss image hardcopy user interface for a digital copier or office multifunction hardware device comprising instructing a user to indicate a base image by hitting a suitably designated button and indicating a desired gloss image also by hitting a suitably designated button. This is followed by flattening the indicated desired gloss image into a gloss image binary file. There is provided a first halftone having a first anisotropic structure orientation and a second halftone having a second anisotropic structure orientation different from that of the first halftone such that halftoning of the base image may be performed by toggling between the provided first halftone and the provided second halftone as directed by the gloss image binary file.

DETAILED DESCRIPTION

By proper utilization of the perceived differential gloss inherent between various anisotropic halftone dot structures, the desired manipulation of perceived gloss and the generation of Glossmark™ images via that differential gloss may be achieved without the need for special paper or special toners or inks. However, to best allow Glossmark™ image technology to be proffered as a complete product offering, there needs to be a convenient method to enable relatively unskilled office workers and print shop operators to generate Glossmark™ differential gloss images and prints in a straight-forward, on-the-fly, and uncomplicated manner.

In consideration of these needs there is provided herein a user interface and a Graphic User Interface (GUI) for creating Glossmark™ Images. These user interfaces provide for selecting among the various Glossmark™ patterns, and adjusting the size and position of the Glossmark™ differential gloss image with respect to the selected base image. The GUI variant solves the problem that unlike some other watermark methods, Glossmarks rely upon an interaction with the underlying base image structure, and optimal placement requires visual feedback of the two images together. Because Glossmark™ differential gloss images do not manipulate the base contone image but only modify the halftone structure of a print, a Glossmark™ is not normally visible on a computer display of the base image. One GUI embodiment provided herein allows selection of the base image, the desired gloss image, and allows a digital overlay for monitor display by showing outlines of the binary gloss image or altering color values of the base image.

Figure 1:
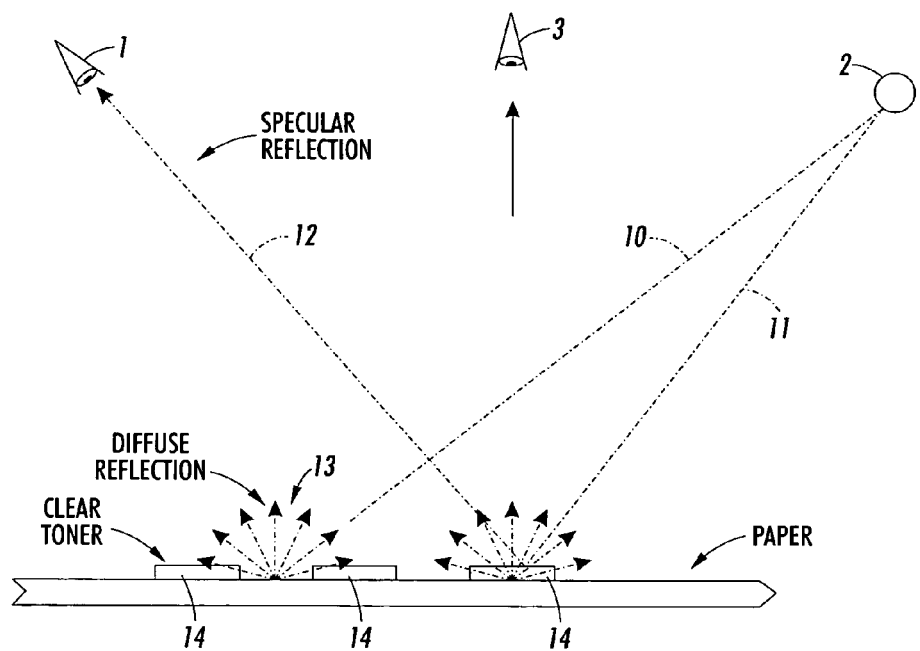
FIG. 1 shows how the human eye can detect a large difference between the glossy portions of the page but a scanner detector cannot.

FIG. 1 shows how the human eye 1 can read gloss upon the page and a scanner cannot from the angle it is operated from. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner or a human eye at position 3 reads incident light at right angles to the paper. In this case, there is only a small amount of diffused light coming from both the glossy and non-glossy dots, and the scanner cannot detect a difference. This is one manner for creating a gloss image which cannot be scanned by conventional copiers and scanners.

Figure 2:
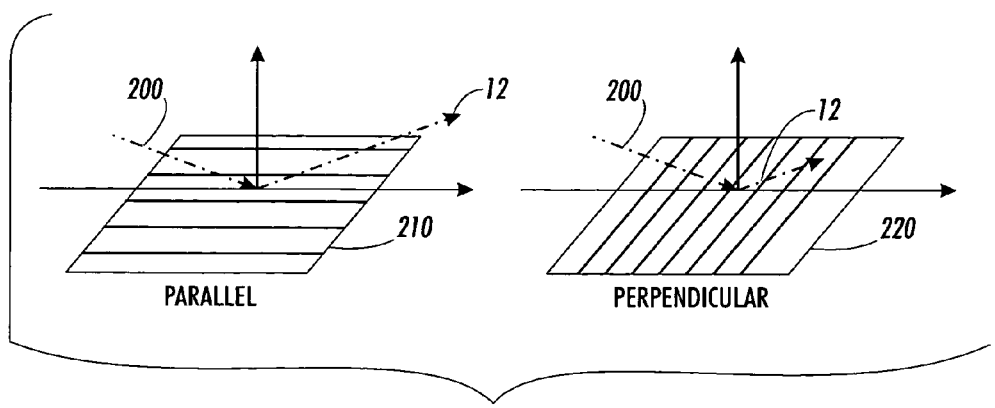
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which the inherent gloss is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a Glossmark™ image. The perceptibility of this gloss differential will be maximized when the halftone anisotropic orientations are 90 degrees apart as shown here in FIG. 2.

Figure 3:
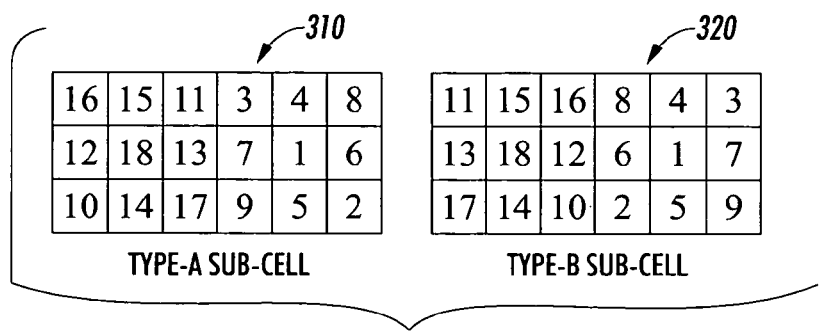
FIG. 3 shows two 3×6 halftone patterns suitable in anisotropic structure to produce discernable gloss differential for practicing the present invention.
Figure 4:
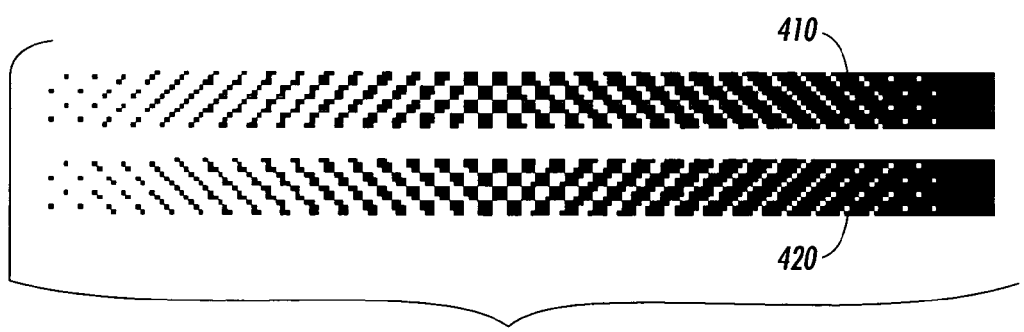
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
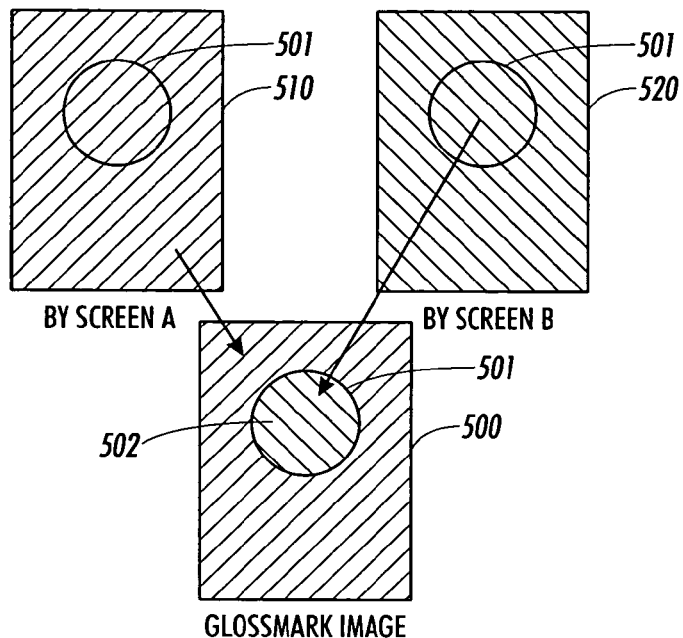
FIG. 5 depicts a patchwork alternating of the two halftone patterns of FIG. 3 so as to achieve a Glossmark™ image.

FIG. 5 depicts a Glossmark™ image 500 achievable using halftone cells as described above. Screen-A 510 uses one halftone cell type and screen-B 520 uses the other. The circle 501 is provided as a visual aid across the image screens 500, 510 and 520. The desired Glossmark™ image here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patch-worked together to create the Glossmark™ image 500.

Figure 6:
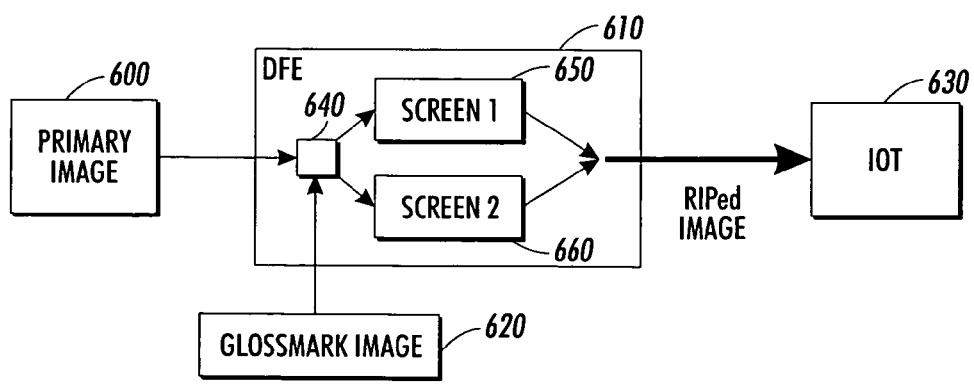
FIG. 6 shows one embodiment for achieving the image directed alternation of the halftone patterns for Glossmark™ images as depicted in FIG. 5, utilizing the halftone patterns of FIG. 3.

An another approach for the assembly of a Glossmark™ or differential gloss image is diagramed in FIG. 6. Here, the primary image 600 is received as input data to the digital front-end (DFE) 610 as is normal. However, a desired gloss image data 620 is also received as input data to the DFE 610 as well. The processed image as sent to the image output terminal (IOT) 630 is a binary image by halftoning the primary image 600 data as is normal. However, the halftone type selection is driven by the intended gloss image data 620 as input to multiplexer switch 640. The intended gloss image data 620 will serve to direct a portion of the primary image 600 to use a first anisotropic structured halftone while directing an alternative halftone to be used for the remainder of primary image 600. As will be understood by those skilled in the art, the intended gloss image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired gloss image data 620, to produce the composite result of raster input processed (RIP) image data as passed to the IOT 630. In this way, a superimposition of a pattern 620 is imbedded into the primary image 600 which can only be perceived as a gloss differential Glossmark™ image.

Figure 7:
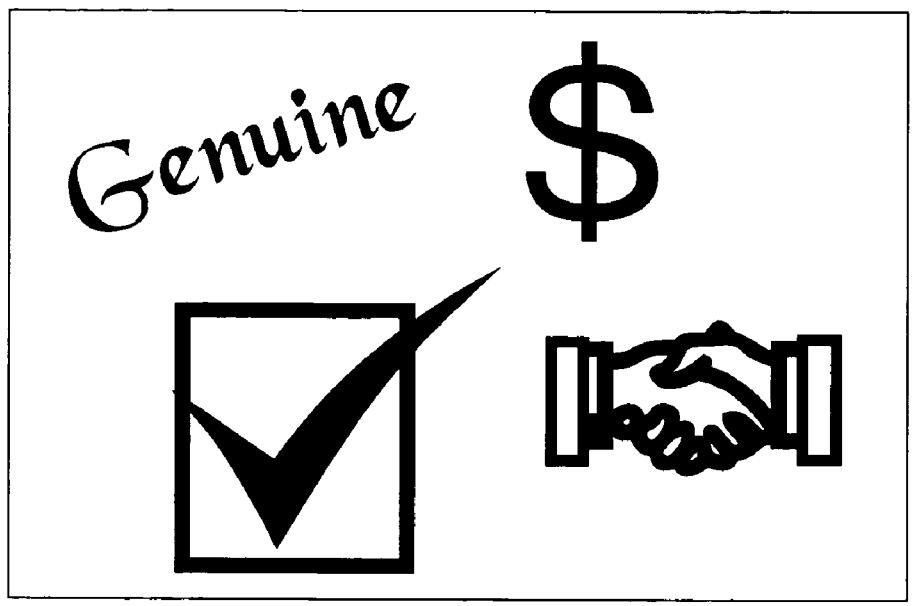
FIG. 7 depicts "flat" binary gloss image examples.

In order to add a Glossmark™ to an image, a second image (an intended or desired gloss image) is used to alter the image halftoning structure. This alteration becomes visible under certain angles of illumination and not under other angles, i.e.: the original, base image is not disturbed in normal viewing, but the intended Glossmark™ gloss image can be made visible when tilting the image in the light. In FIG. 7, there is depicted intended binary gloss image examples as incoming flat binary intended gloss data, which are utilized as the input to multiplexer switch 640.

Figure 8:
FIG. 8 depicts an example base image file.

In order to create Glossmark™ images, two files are necessary. First, the Base Image file such as for example as is depicted in FIG. 8. This file is the "normal" image that is seen when casually looking at the print. It serves as the background over which the intended gloss image is located. This image can be created in or be the result of any appropriate image manipulation application, such as for example Adobe Photo-Shop™. This image forms the base for the Glossmark™ and should have a sufficient image area in the mid-tones so that the desired differential gloss image will be visible. (It should be noted that the rendering in FIG. 8 is necessarily of a binary nature for displayed inclusion with this specification, but that the actual image in operation is of a continuous tone or contone nature) The second file is the intended or desired gloss image file. This file encapsulates the actual gloss image file that is placed over the base image and thus is intended to be visible as a differential gloss image in the hardcopy output. This file needs to be a binary image data type, meaning that only "black" and "white", or "zero" and "one" pixel values are allowed. This can be achieved, for example, by using "Image→Mode→Bitmap" commands in PhotoShop™ or by any other image manipulation software using the appropriate commands to create a binary representation. The desired gloss image file may also have its resolution adjusted to match up with the base image data if so needed. Examples of good gloss images would look like any of the example elements as depicted in FIG. 7. It should be noted that even complex patterns, such as halftoned images, can theoretically be used as gloss patterns, however, simple patterns like those shown in FIG. 7 are generally preferred.

A GUI to create Glossmark™ images consists of a file chooser for the base image, and a file chooser for the gloss pattern. Both files can be displayed in the GUI, thus enabling a quick verification of the desired layout. A third image representation can also be displayed. In this representation the intended gloss pattern is superimposed as a placeholder over the base image to verify Glossmark™ size, location, etc. Since the Glossmark™ or true differential gloss can not be created or even simulated on a standard monitor (be it CRT or LCD), an alternate version for depiction is created in which the Glossmark™ location is created by a digital overlay placeholder modifying the actual base image data. Of course in the actual Glossmark™ hardcopy print, no manipulation of the base image data will be performed, but rather a modification of the halftone structure will be executed under the Glossmark™ pattern control as described above. The digital overlay for monitor display purposes can be done by only showing the outlines of the desired gloss pattern (this will generally work since desired differential gloss patterns are binary in nature), it can be done by changing the color values of the base image in dependence of the pattern or as will be understood by those skilled in the art, with any other known method for altering digital images such as a grayscale intensity shift. This means that the GUI does not represent the actual changes made to the base image during printing, as would be the normal approach to a GUI, but that instead it represents a placeholder.

Figure 9:
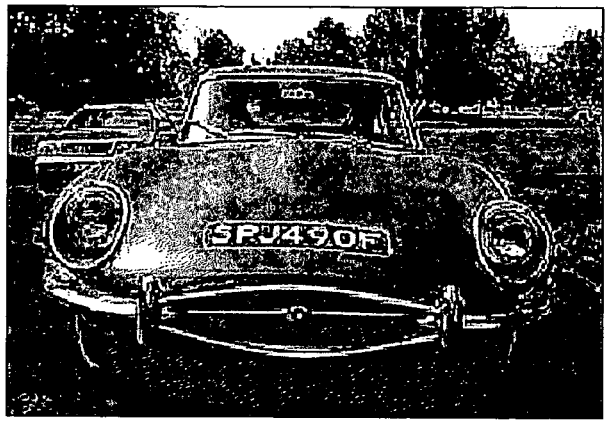
FIG. 9 depicts an additional example base image file.
Figure 10:
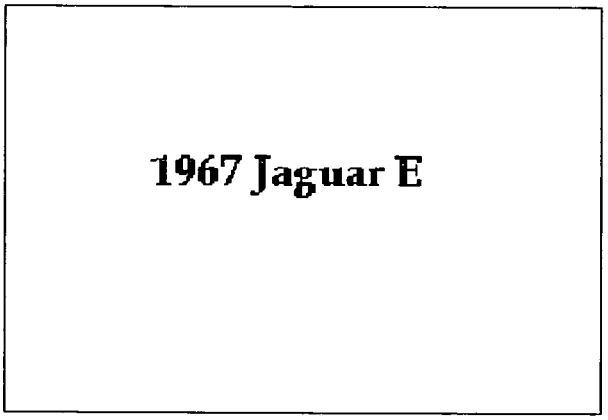
FIG. 10 depicts an additional binary gloss image example.
Figure 11:
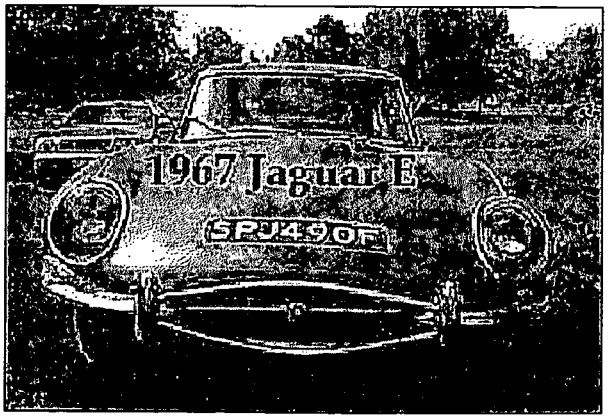
FIG. 11 depicts the superimposition of the image base data from FIG. 9 with the binary gloss image of FIG. 10.

The general structure is shown with FIGS. 9, 10, and 11. The base image of FIG. 9 is selected and displayed, in this case the image of a car, as the primary image data 610. This image will be visible under normal viewing conditions. Next, the desired gloss pattern is selected as depicted in FIG. 10, in this case the simple text string "1976 Jaguar E" is also shown in the GUI. Simultaneously, the gloss pattern size and location is indicated in the composite image of FIG. 11 by suitably modifying the base image data in superimposition, in this case simply shifting the image brightness or contrast. This composite image is an aid in locating the intended gloss pattern into the correct spot of the base image and to verify the size and geometric relationship. The verification image is thus only an inspection tool indicative of the relationship between base image and desired differential gloss image and not normally a verification of the look, feel or quality of the final Glossmark™ hardcopy print. It should be noted that the problem of "correctly" locating a watermark is not common in digital watermarking. Rather a digital signature is spread over the entire image in order to reduce the sensitivity to editing. As such, the Glossmark™ modifications are unique since they are influenced by the relative geometrical relationship and a GUI such as taught herein allows the user to correctly create this relationship.

In just one example embodiment of a suitable user interface, the base Image file and gloss image file are combined into the actual Glossmark™ Image file, either as a Postscript™ file or as EPS. The software will bring up a simple interface with one button to select the Base Image, i.e.: the image visible at all times, and one button to select the gloss image file. File selection follows standard Mac OSX or other operating system procedures. After both files are selected, a Glossmark™ Image file can be created in either Postscript™ or EPS format by clicking the appropriate button on the interface. Creating the Glossmark™ Image file step-by-step: Start the Glossmark™ Generator; Click Base Image; Select the base image inside the file browser; Click Glossmark™; Select the desired gloss image file inside the file browser; Select Output Format as either Postscript™ or EPS; Select Create Glossmark™; Enter the Glossmark™ Image file name; and Save. Thus the Glossmark™ Image file is ready for printing or post-processing as the Glossmark™ Image file is now available in a specified directory. Postscript™ files can be directly printed and EPS can be used in other applications, such as page layout applications. It should be noted that other file formats might be used, such as TIFF, PNG, JPG etc.

Glossmark™ Image Generation In Hardware System Based Environment may be graphical based, or command based, or push button based. In a machine hardware scenario such as found with an office multifunction device, scanner or a digital copier/printer, a "button" labeled Glossmark™ is provided, which when pushed will instruct the operator/user to: first place a base image upon the platen and hit copy; second, place desired Glossmark™ overlay image upon the platen and hit the copy button again. With the completion of the above steps the operation software will generate the Glossmark™ image and a Glossmark™ differential gloss print will result as hardcopy output.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A methodology for a differential gloss image user interface comprising:

instructing a user to indicate a base image;
   instructing the user to indicate a desired gloss image;
   manipulating the desired gloss image data to be a binary representation if needed;
   adjusting the resolution of the binary representation to match the base image if needed;
   superimposing the binary representation of the desired gloss image over the base image by modifying the base image data in those locations where the binary representation of the desired gloss image overlays the base image by shifting the base image brightness or contrast in those overlay locations to provide a third image representation for display that will provide the user visual feedback as to where the desired gloss image will be best rendered;
   instructing the user to indicate the relative position of the desired gloss image relative to the base image by interaction with the displayed third image representation;
   providing a first halftone having a first anisotropic structure orientation;
   providing a second halftone having a second anisotropic structure orientation different from that of the first halftone; and
   halftoning the base image with the provided first halftone and the provided second halftone toggling between the provided first halftone and the provided second halftone as directed by the user indicated relative position of the desired gloss image as provided by the third image representation for display.

2. The method of claim 1 wherein the first anisotropic structure orientation and the second anisotropic structure orientation are 90 degrees apart.

3. The method of claim 2 wherein the first anisotropic structure has a 45 degree orientation to the right and the second anisotropic structure has a 45 degree orientation to the left.

4. The method of claim 1 further comprising supplying the resultant differential gloss image as a data file.

5. The method of claim 1 further comprising supplying the resultant differential gloss image as a hardcopy print.

6. The method of claim 1 wherein the base image data is modified by shifting the base image color values.

7. The method of claim 1 wherein the base image data is modified by shifting the base image grayscale intensity.

* * * * *